(12) United States Patent
Erickson et al.

(10) Patent No.: US 8,286,917 B2
(45) Date of Patent: Oct. 16, 2012

(54) ATTACHMENT ASSEMBLY AND METHOD

(75) Inventors: Harold G. Erickson, Mukilteo, WA (US); Rolando G. Taguinod, Renton, WA (US)

(73) Assignee: The Boeing Company, Chicago, IL (US)

( * ) Notice: Subject to any disclaimer, the term of this patent is extended or adjusted under 35 U.S.C. 154(b) by 1193 days.

(21) Appl. No.: 12/118,750

(22) Filed: May 11, 2008

(65) Prior Publication Data

US 2009/0321574 A1 Dec. 31, 2009

(51) Int. Cl.
*B64C 1/06* (2006.01)
(52) U.S. Cl. .................................................. 244/131
(58) Field of Classification Search .............. 244/131, 244/102 R, 173.1, 159.4; 248/300, 201
See application file for complete search history.

(56) References Cited

U.S. PATENT DOCUMENTS

| | | | | |
|---|---|---|---|---|
| 3,181,904 | A * | 5/1965 | Fallarino et al. | 292/93 |
| 3,498,658 | A * | 3/1970 | Steenstra et al. | 292/167 |
| 3,799,593 | A * | 3/1974 | Dielman | 292/145 |
| 4,315,647 | A * | 2/1982 | Wilzig et al. | 292/143 |
| 4,715,565 | A * | 12/1987 | Wittmann | 244/173.1 |
| 5,004,277 | A * | 4/1991 | Campbell et al. | 292/166 |
| 5,527,074 | A * | 6/1996 | Yeh | 292/177 |
| 5,806,799 | A * | 9/1998 | Lounge | 244/159.4 |
| 6,702,232 | B2 | 3/2004 | Dovey et al. | |
| 7,429,021 | B2 * | 9/2008 | Sather et al. | 248/201 |
| 7,784,734 | B2 * | 8/2010 | Christman | 244/102 R |
| 8,047,467 | B2 | 11/2011 | Erickson | |
| 2007/0029812 | A1 * | 2/2007 | Monts de Oca | 292/137 |
| 2008/0116094 | A1 | 5/2008 | Truong | |
| 2010/0115864 | A1 * | 5/2010 | de La Fontaine et al. | 52/217 |
| 2010/0230563 | A1 * | 9/2010 | Flynn | 248/201 |

* cited by examiner

*Primary Examiner* — Tien Dinh
*Assistant Examiner* — Valentina Xavier
(74) *Attorney, Agent, or Firm* — Novatech IP Law; Sean O'Neill; Euclid Woo

(57) ABSTRACT

An attachment assembly may be adapted for securing a panel member such as a class divider or a secondary door to a mating structure. The attachment assembly comprises at least one structural pin configured to be extendable from a retracted position to a deployed position. The attachment assembly may include a base support configured to be placed in overlapping contact with the panel member. The attachment assembly may include a primary support configured to be mountable such as in overlapping contact to the base support and having at least one sleeve sized and configured to receive the structural pin which is telescopically movable. A locking mechanism such as a quick release pin may be inserted through bores formed in the sleeve and in the structural pin to prevent axial movement of the structural pin relative to the sleeve.

10 Claims, 9 Drawing Sheets

ATTACHMENT ASSEMBLY AND METHOD

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to structural attachment systems and, more particularly, to an attachment assembly for removably securing a panel member such as a class divider or a secondary door of an aircraft.

BACKGROUND

Many commercial aircraft are fitted with partitions that divide the seating sections of the aircraft passenger compartment. Such partitions are referred to as class dividers and are typically installed between rows of seats in order to divide different seating sections such as first class seating section from business class and economy class seating. In order to reduce final assembly time of the aircraft as well as to facilitate re-configuration of the seating sections in the aircraft cabin, it is desirable that class dividers are easily and quickly installed at a desired location in the aircraft cabin.

Conventional attachment assemblies for mounting class dividers to the interior of the aircraft cabin include a variety of attachment mechanisms using assorted hardware and fasteners. For example, in one prior art attachment assembly for a class divider, a set of engagement mechanisms such as pins are employed to secure the lower end of the class divider to the floor of the aircraft cabin. The pins are configured to engage the seat track which typically extends lengthwise along the cabin floor and which is conventionally used to secure the seats.

To secure the upper end of the class divider to the aircraft cabin, conventional attachment assemblies include various mechanisms which connect the class divider to the ceiling interface or substructure of the aircraft cabin using various fittings and loose fastening hardware such as nuts, bolts and washers. Installation of such hardware commonly requires the use of conventional tools as well as some special tools. The attachment assemblies are secured to the aircraft cabin using the supplied hardware. The fasteners are typically tightened to a predetermined torque value using a torque wrench.

Following torquing, each of the fasteners may undergo a time-consuming verification process wherein the torque value of each fastener may again be checked with the torque wrench. A torque-striping process may also follow wherein a visual stripe is placed on the fastener and adjoining structure to provide a visual indication that the fastener has been torqued and also to provide an indication as to whether or not the hardware has loosened over time.

In addition to the time-consuming process described above, another drawback associated with conventional attachment methods for class dividers is that the fastening hardware and the tools used to install such hardware may become lost during installation. Unless recovered, such hardware or tools may become foreign object debris (FOD) which can cause damage to the aircraft. More specifically, such FOD in the form of lost hardware and tools may become lodged in aircraft controls, mechanisms or other moving parts and may jam or restrict the operation of such mechanisms. In addition, the hardware and tools may cause electrical shorts and in general, may compromise the overall structural and functional capabilities of the aircraft.

Attachment assemblies for class divider are typically required to withstand various types of loads, some of which are of relatively high magnitude. Some aircraft requirements provide that class dividers must have the capability to withstand loads of 9 G's in the forward and aft directions. In addition, class dividers must also be capable of withstanding forward and aft loads imposed thereupon during a decompression event as may occur if an opening is created in the cabin when the aircraft is traveling at high altitude and/or at high speed.

In this regard, class dividers are typically required to withstand loads that are oriented primarily in the forward and aft directions but which allow relative movement of the aircraft cabin in the vertical direction. For example, attachment assemblies for class dividers are typically configured to provide flexibility in the vertical direction to allow for relative movement between the ceiling and floor of the aircraft cabin under the dynamic loading conditions that occur during flight. Additional loads which the class divider must be capable of withstanding include abuse loads which may be defined as loads imposed by passengers leaning on the class divider or using the class divider to steady themselves when moving about the aircraft cabin.

In light of the above noted drawbacks regarding the time-consuming manner in which prior art class dividers are installed, it can be seen that there exists a need in the art for an attachment assembly which facilitates rapid installation of class dividers or other panel members in order to reduce final assembly cycle time of an aircraft or other vehicle or structure. Furthermore, there exists a need in the art for an attachment assembly which facilitates rapid removal and re-installation of a panel divider in an aircraft cabin to allow for rapid reconfiguration of the cabin space for different seating class configurations (e.g., first class, business class, coach class).

In addition, there exists a need in the art for an attachment assembly for a panel member which does not require the use of tools and loose hardware which can become lost or generate FOD. Additionally, there exists a need in the art for an attachment assembly which can withstand design loads in forward and aft directions but which allows for free movement of the aircraft ceiling relative to the floor without transmitting loads through the class divider. Finally, there exists a need in the art for an attachment assembly that is of simple construction, low cost and which is lightweight.

SUMMARY

The present disclosure specifically addresses the above-described needs associated with installation of panel members such as class dividers in an aircraft cabin by providing an attachment assembly having telescoping structural pins which are engageable to mating structure and wherein the attachment assembly is installable without the use of special tools or loose hardware. The technical effects of the disclosed embodiments include a reduction in cycle time for installation of class dividers in an aircraft cabin or a secondary door of a flight deck and a reduction in the amount of time required for reconfiguring the seating section of the aircraft cabin by relocating the class dividers.

The attachment assembly provides a self-contained attachment mechanism that facilitates transfer of loads from the panel member (e.g., a class divider or a secondary door) to mating structure such as to the aircraft ceiling structure. The attachment assembly may be mounted to a variety of different configurations of panel members and is not limited to class dividers and secondary doors.

Advantageously, the attachment assembly allows for movement of the aircraft ceiling relative to the cabin floor in the vertical direction as may occur frequently during flight under dynamic loading conditions. A further advantage of the attachment assembly as disclosed herein is a reduction in the total number of parts required for installation of the class divider in the aircraft cabin and a reduction in the quantity of loose hardware and tools required to install the attachment assembly as compared to prior art installations. As was mentioned above, loose hardware and tools, if lost, may become foreign object debris (FOD) which may cause damage to the aircraft.

In one embodiment, the attachment assembly comprises at least one and, more preferably, a pair of structural pins which are configured to be extendable or telescoping from a retracted position to a deployed position. The structural pins may be aligned in the same plane with one another and may be oriented in angled or parallel relationship to one another. The structural pins are configured to be axially slidable within a corresponding set of sleeves of the attachment assembly.

The sleeves may be integrally formed with a primary support of the attachment assembly or they may be separately formed and mounted to the primary support. The primary support may, in turn, be interconnected to a base support that may be directly mounted to the panel member (e.g., class divider) such as by mechanical fastening and/or by bonding. The primary support and base support may be configured with U-shaped cross sections to facilitate an overlapping or nested interconnection therebetween.

The base support and primary support may optionally be provided with features to facilitate lateral adjustment of the primary support relative to the base support. For example, the base support may include a pair of laterally oriented bosses which are engageable to the primary support via a corresponding pair of channel sections. The channel sections may includes slots or slotted holes through which a fastener may be extended to threadably engage a threaded member disposed within the bosses. After laterally adjusting the primary support such that the structural pins are aligned with mating features in the aircraft ceiling structure, the fasteners may be tightened such that the primary support is frictionally engaged to the base support. Depending upon their geometry, the bosses and channel sections may also be configured to resist vertical movement of the primary support relative to the base support.

The structural pins may be fixed in position within the sleeves in a retracted position or in a deployed position by means of a locking mechanism such as a quick release pin. Toward this end, the structural pins may include a spaced pair of apertures or bores formed in the structural pins corresponding to the retracted and deployed positions. The sleeves may also include an aperture or bore sized complementary to the quick release pin. The structural pin is axially positioned relative to the sleeve such that the apertures or bores formed in the structural pin are in alignment with the apertures or bores formed in the sleeves. The quick release pin is inserted through the aligned bores in order to lock the structural pin in the retracted position or in the deployed position.

An anti-rattle pin may optionally be provided to engage the structural pin against an inner side of the sleeve to prevent noise-producing vibration otherwise caused by direct contact between the structural pin and the sleeve. A stop may also be provided with the structural pin in order to limit upward axial movement of the structural pin within the sleeve. The stop may be receivable into a recess formed in a lower end of the sleeve to provide a clocking mechanism to the structural pin relative to the sleeve which may facilitate alignment of the apertures or bores that are formed in the structural pins and sleeves. A biasing mechanism such as a compression spring may be optionally included with the attachment assembly in order to bias the structural pin into the deployed position as may be desirable for applications wherein manual access to the structural pin is limited.

In a further embodiment, the attachment assembly may be implemented in a secondary door which may be installed adjacent a flight deck door. The secondary door may be installed as a security measure between the flight deck door and the aircraft cabin. The attachment assembly may be integrated into a door frame of the secondary door on opposing sides of the door frame. In the secondary door embodiment, the pair of structural pins may be disposed within the door frame interior and may be extendable from the retracted position to the deployed position to engage housing supports or other mating structure of the aircraft.

Biasing mechanisms such as compression springs are preferably included with the secondary door embodiment in order to bias the structural pins upwardly from the retracted position to the deployed position. The attachment assembly may include an anti-rotation pin fixed to the interior of the door frame and configured to engage a groove formed axially along a length of the structural pin in order to maintain the orientation of the structural pin relative to the housing supports into which the structural pins are extended in the deployed position. A corresponding groove may be formed in the door frame to facilitate insertion of a tool for engaging the structural pin to allow for manual repositioning of the structural pin (i.e., moving the structural pin downwardly) from the deployed position to the retracted position.

The features, functions and advantages that have been discussed can be achieved independently in various embodiments of the present invention or may be combined in yet other embodiments, further details of which can be seen with reference to the following description and drawings.

BRIEF DESCRIPTION OF THE DRAWINGS

These and other features of the disclosed embodiments will become more apparent upon reference to the drawings wherein like numbers refer to like parts throughout and wherein.

DETAILED DESCRIPTION OF THE INVENTION

Figure 1:
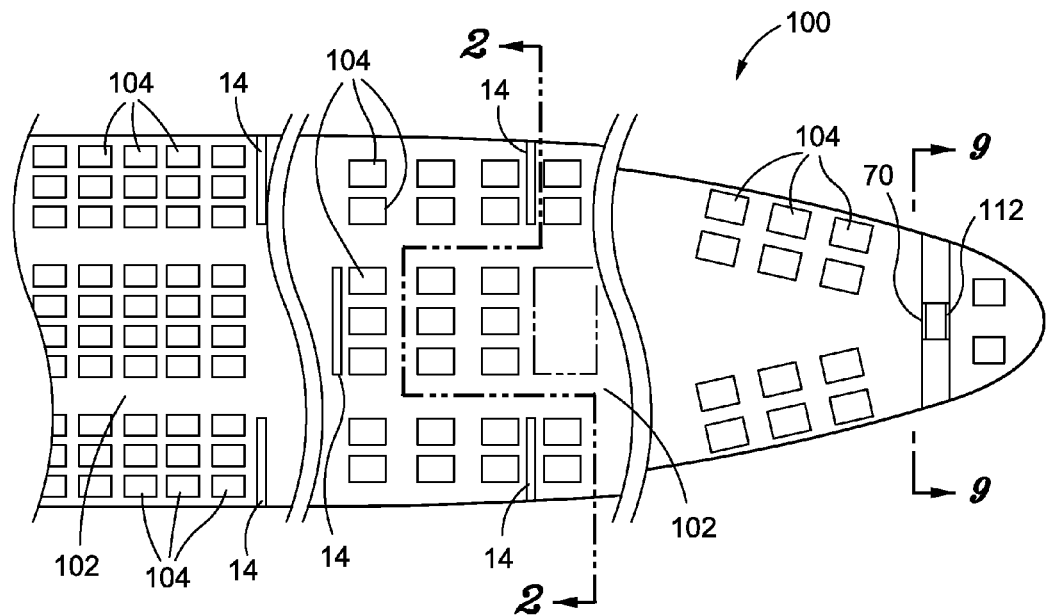
FIG. 1 is a diagrammatic illustration of a seating layout of an aircraft cabin and illustrating a plurality of class dividers separating the different seating sections.

Referring now to the drawings wherein the showings are for purposes of illustrating preferred and various embodiments of the present disclosure only and not for purposes of limiting the same, FIG. 1 is a diagrammatic illustration of a seat layout of an interior of an aircraft cabin 102 and further illustrating a plurality of class dividers 14 positioned at the indicated locations between rows of seats 104. As is well known, such class dividers 14 are used to separate different classes of seats 104 within the aircraft cabin 102.

Figure 2:
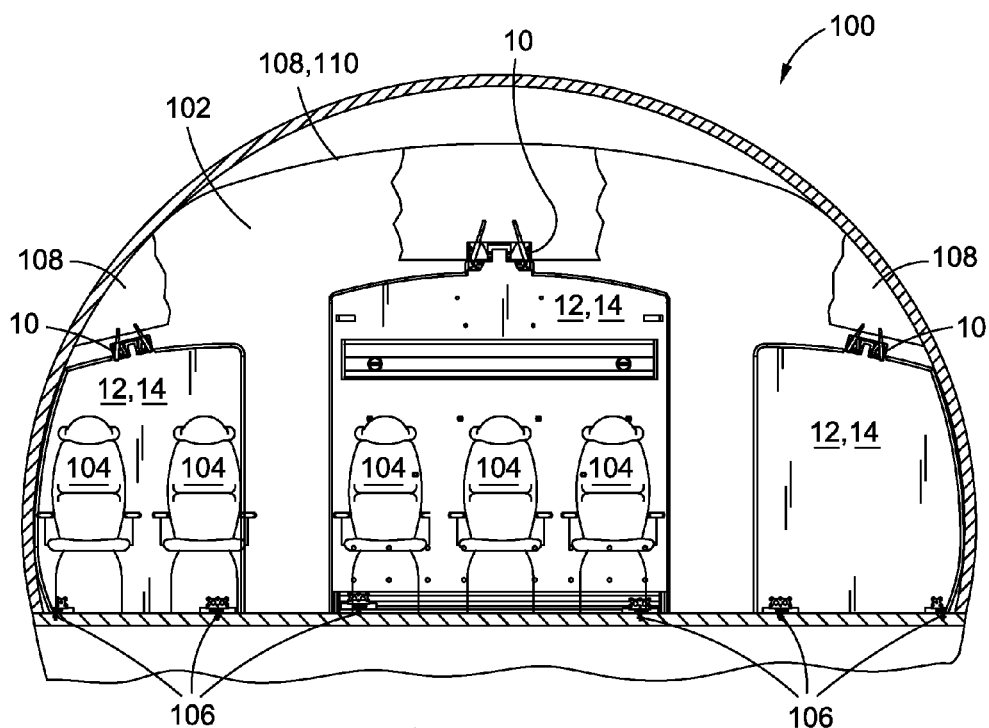
FIG. 2 is a sectional illustration of the aircraft cabin taken along lines 2-2 of FIG. 1 and illustrating the class dividers located at a center section of the aircraft cabin and the class dividers located at outward sections of the aircraft cabin.

As can be seen in FIG. 2, the class dividers 14 may be secured to an aircraft ceiling structure 108 by means of an attachment assembly 10 which, in one embodiment, may be mounted to an upper end of the class divider 14. A lower end of the class divider 14 may be secured to the aircraft cabin 102 by means of a pair of engagement mechanisms 114 for engaging seat tracks 106 which typically extend along a length of the aircraft cabin 102 floor and to which the seats 104 are typically secured.

Figure 3:
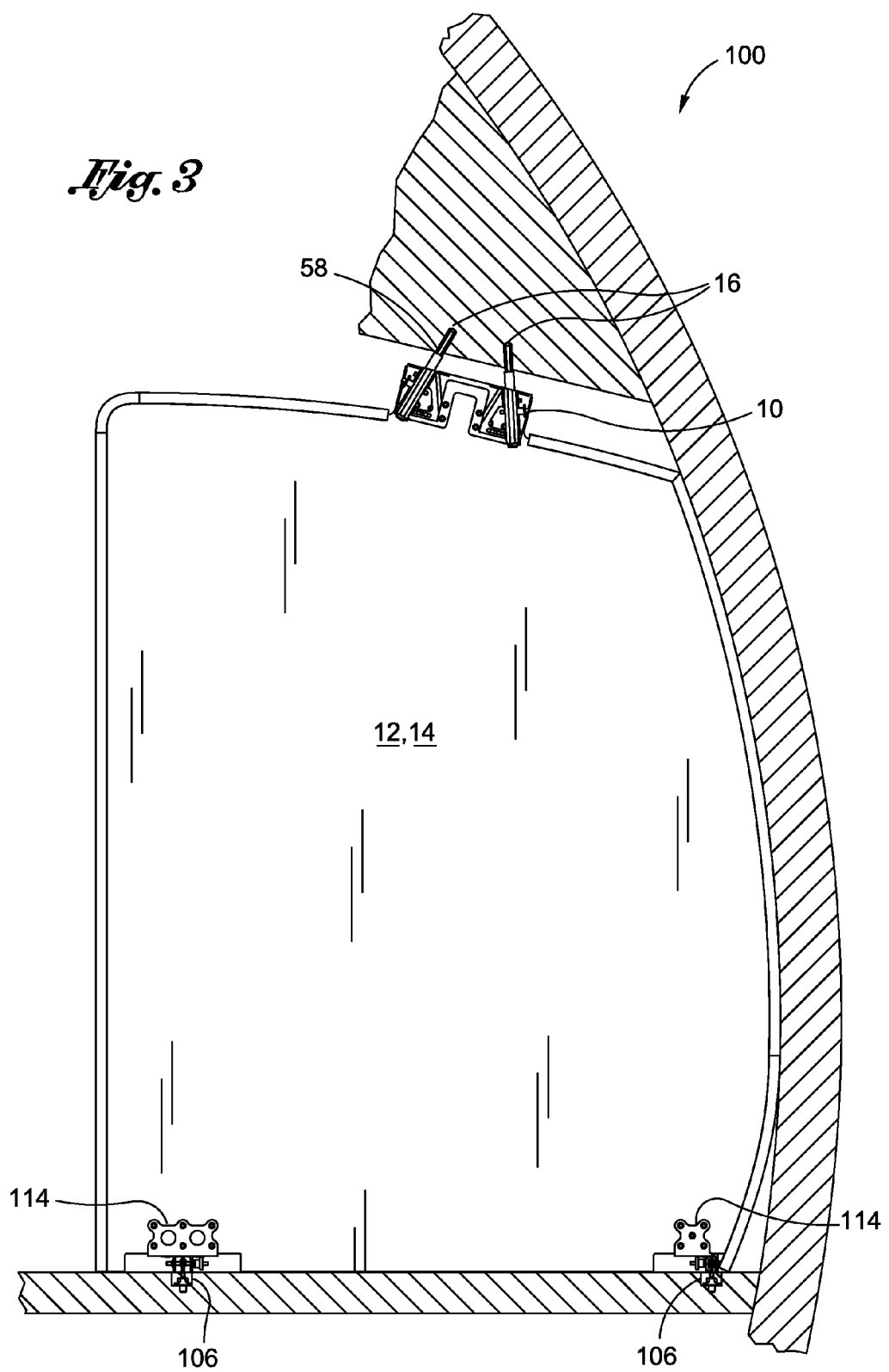
FIG. 3 is an enlarged sectional view of an outward class divider illustrating an attachment assembly in one embodiment for securing the class divider to a ceiling substructure and further illustrating a pair of engagement mechanisms disposed on a lower end of the panel divider for engaging a corresponding pair of seating rails extending along a floor of the aircraft cabin.

FIG. 3 illustrates an exemplary mounting of the attachment assembly 10 to an upper end of one of the class dividers 14 and further showing a pair of structural pins 16 which are preferably included in the attachment assembly 10 for engagement to an aircraft ceiling structure 108. Although the attachment assembly 10 is illustrated in the exemplary embodiment as having a pair of the structural pins 16, any number of structural pins 16 may be included. In this regard, only a single structural pin 16 may be included with the attachment assembly 10.

Furthermore, although the attachment assembly 10 is illustrated as being mounted on an upper end of the class divider 14, the attachment assembly 10 may be disposed or mounted along any location (i.e., sides, bottom end) of the class divider 14. It should also be noted that although the structural pins 16 of the attachment assembly 10 illustrated in FIG. 3 are showed as being disposed in nonparallel relationship to one another, the structural pins 16 are preferably oriented in parallel relationship to one another in order to simplify construction and installation and to minimize the transfer of vertical loads through the class divider 14.

As will be described in greater detail below, the attachment assembly 10 may be universally applied to a variety of panel member 12 configurations including, but not limited to, the exemplary class divider 14 shown in FIGS. 3-8 as well as a secondary door 70 installation illustrated in the FIGS. 9-15. As will be described in greater detail below, the structural pins 16 are specifically adapted to be extendable from a retracted position 22 to a deployed position 24. The attachment assembly 10 provides for the installation of class dividers 14 or other panel members 12 without the use of special tools or separate hardware such as loose nuts, bolts and washers typically required in prior art class divider installations.

Referring in detail now to FIGS. 3-8, shown is the attachment assembly 10 in one embodiment for securing the class divider 14 (i.e., panel member) to a mating structure. Such mating structure includes, but is not limited to, an aircraft ceiling structure 108 or other aircraft structural elements. In this regard, the attachment assembly 10 may be configured to facilitate mounting of a wide variety of panel members 12 to different types of mating structure.

As can be seen in FIGS. 3-8, the attachment assembly 10 in one embodiment may include a base support 30 and a primary support 32. In the figures, the base support 30 may have a generally U-shaped configuration although other configurations are contemplated. The base support 30 is preferably configured to be placed in generally overlapping contact with at least one of the opposing sides of the panel member 12. More specifically, the base support 30 may have a U-shaped configuration sized complementary to a thickness of the panel member 12 such that the panel member 12 is disposed in abutting contact with outer surfaces of the panel member 12. In one embodiment, the base support 30 may be connected or secured to the panel member 12 by at least a mechanical fastening means or by bonding using any suitable adhesive.

Figure 8:
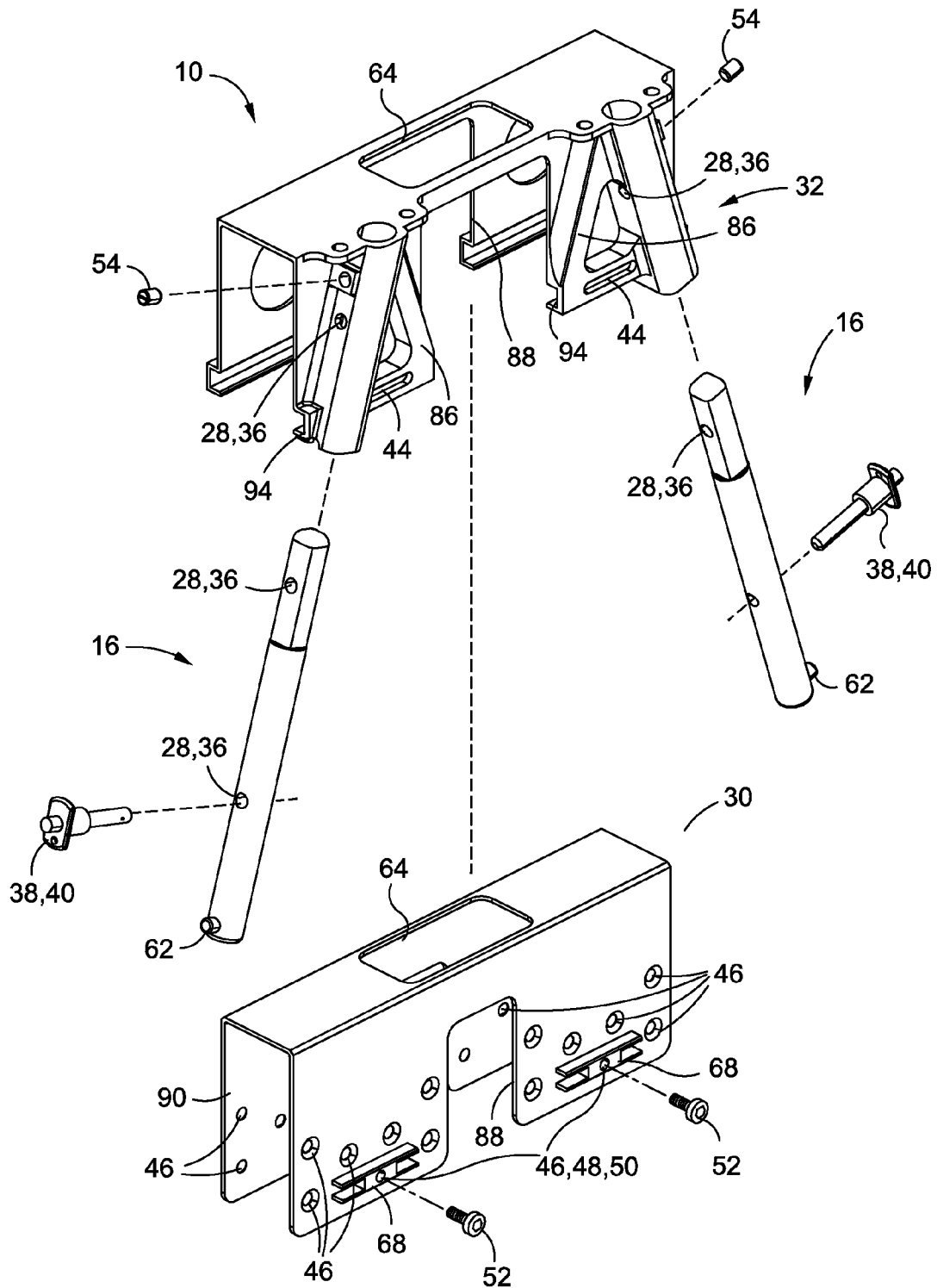
FIG. 8 is an exploded illustration of the attachment assembly showing the primary support in one embodiment having the sleeves integrally formed therewith and further illustrating the base support having a pair of bosses for facilitating lateral adjustment of the primary support relative to the base support.

Referring to FIG. 8, the base support 30 is best seen as having a generally U-shaped configuration comprising a horizontal leg 90 and a pair of downwardly extending legs 90. The base support 30 may be fabricated of any suitable material including, but not limited to, any suitable metallic or polymeric material including composite fabrication. In one embodiment, the base support 30 may be initially provided as a metallic extrusion such as an aluminum extrusion from which the base support 30 may be finish machined to include the various features illustrated in FIG. 8. For example, the base support 30 may include a pair of transversely oriented bosses 68 disposed on a lower end of a downwardly extending leg 90 of the base support 30.

As best seen in FIG. 8, the bosses 68 may be generally rectangularly shaped and having a size and configuration which is complementary to channel sections 92 formed in the legs 90 of the primary support 32 and which may be adapted to receive the bosses 68 of the base support 30. In this regard, the primary support 32 is laterally slidable relative to the base support 30 and is fixedly secured thereto such as by means of fasteners 52 which may extend through a pair of slots 44 formed in the primary support 32. The fasteners 52 may engage threaded elements such as threaded fastener holes 46 or a threaded member 48 such as an insert or a helicoil 50. FIG. 8 illustrates the bosses 68 being formed on each of opposing sides of the base support 30 although the bosses 68 may be omitted on any portion of the legs 90. The primary support 32 may include the complementary set of channel sections 92 adapted to receive the bosses 68 in nested fashion.

The primary support 32 is preferably adapted to be mountable in nesting configuration to the base support 30 and being mechanically fastenable thereto. The base support 30 and primary support 32 may be disposed in overlapping relation to one another and being formed with the U-shaped cross section as is illustrated in the figures. The primary support 32 may optionally include a pair of lightening holes 66 on each one of the opposing side of each downwardly extending leg 90. However, the lightening holes 66 may be located at other locations on either of the primary support 32 of base support 30 or may be altogether omitted.

As shown in FIGS. 4-8, cutouts 88 may be included in each of the legs 90 of the primary support 32 and base support 34. Although shown as having a rectangular shape, the cutouts 88 may be provided in a variety of alternative shapes, sizes and configurations and may be positioned at different locations other than the centrally-located position shown in the figures. Furthermore, the cutouts 88 may be altogether omitted.

Each one of the base and primary supports 32, 34 may optionally include a vent 64 located on the horizontal leg 90 of the U-shaped channel as illustrated in the figures. The vent 64 is optionally included with the base and primary support 32, 34 to provide a path for equalization of air pressure between an interior of the panel member 12 (i.e., class divider) which may be comprised of a hollow or semi-hollow core such as honeycomb core. The vent 64 provides a means for air pressure within the panel member 12 to equalize with air pressure in the aircraft cabin 102 as pressure changes with changes in altitude of the aircraft. For example, as the aircraft 100 ascends to higher altitudes, the pressure within the aircraft 100 cab may decrease up to a certain point (i.e., up to the cabin pressurization level). However, for embodiments where the attachment assembly 10 is mounted to a solid core panel member 12 or for applications wherein pressure differential is not an issue, the vents in each of the base support 30 and primary support 32 may be altogether omitted.

Referring still to FIGS. 3-8, although the base support 30 and primary support 32 are shown as having a generally U-shaped configuration, it should be noted that the base support 30 and primary support 32 may be provided in different geometries including a flat or planar configuration. In this regard, the base support 30 and primary support 32 may be provided as simple flat plates disposed in overlapping relation to one another. The bosses 68 and channel sections 92 may optionally be included in the flat plate configurations in order to provide a means for lateral adjustment. In addition to a flat plate configuration, the base support 30 and primary support 32 may be configured in a variety of alternative shapes including L-shaped configurations or other configurations that are complementary to the panel members 12 to which they may be mounted. In a further embodiment, the base support 30 may be altogether omitted from the attachment assembly 10 with the primary support 32 being directly secured to the panel member 12.

Referring still to FIG. 8, the base support 30 may include at least one and, more preferably, a plurality of fastener holes 46 to facilitate connection thereof to the panel member 12. In this regard, such fastener holes 46 may be countersunk to accept flush-mounted fasteners 52 having countersunk heads to provide a smooth surface against which the primary support 32 may slide during lateral adjustment. As was earlier mentioned, in addition to or as an alternative to mechanical fastening of the base support 30 to the panel member 12, the base support 30 may be bonded to the panel member 12 using any suitable adhesive method. Other means may be used to mate the base support 30 to the panel member 12 including, but not limited to, the use of mechanical features which serve to interlock the base support 30 to the panel member 12.

Referring still to FIGS. 3-8, the primary support 32 is configured to be mountable to the base support 30 and is securable thereto by means of the channel sections 92 interlocking with the bosses 68 formed on the base support 30. In addition, the fasteners 52 extending through the slots 44 and into the threaded members 48 provide an additional connection between the base support 30 and primary support 34.

The primary support 32 may further include at least one and, more preferably, a pair of sleeves 34 sized and configured to receive the structural pins 16 therewithin. The sleeves 34 are shown in the figures as being integrally formed with the primary support 32 although the sleeves 34 may be formed as separate components which may be fastened to the primary support 32 such using mechanical fasteners 52 or other means. The sleeves 34 are preferably sized to be complementary to the structural pins 16 to allow axial movement of the structural pins 16 within the sleeves 34.

As shown in FIG. 8, the structural pins 16 may have a generally elongate shape and may be formed as unitary structures defining upper and lower portions 18, 20. As shown in the figures, the structural pins 16 may be generally cylindrically shaped and may be sized to slidably fit within the sleeves 34 which may preferably, but optionally, define a cylindrical inner cross section. The lower portion 20 of the structural pins 16 may be cylindrically shaped while the upper portion 18 may include at least one flat 26 extending along a length thereof to facilitate load transfer from the structural pins 16 into the mating structure which the structural pins 16 engage.

Figure 7:
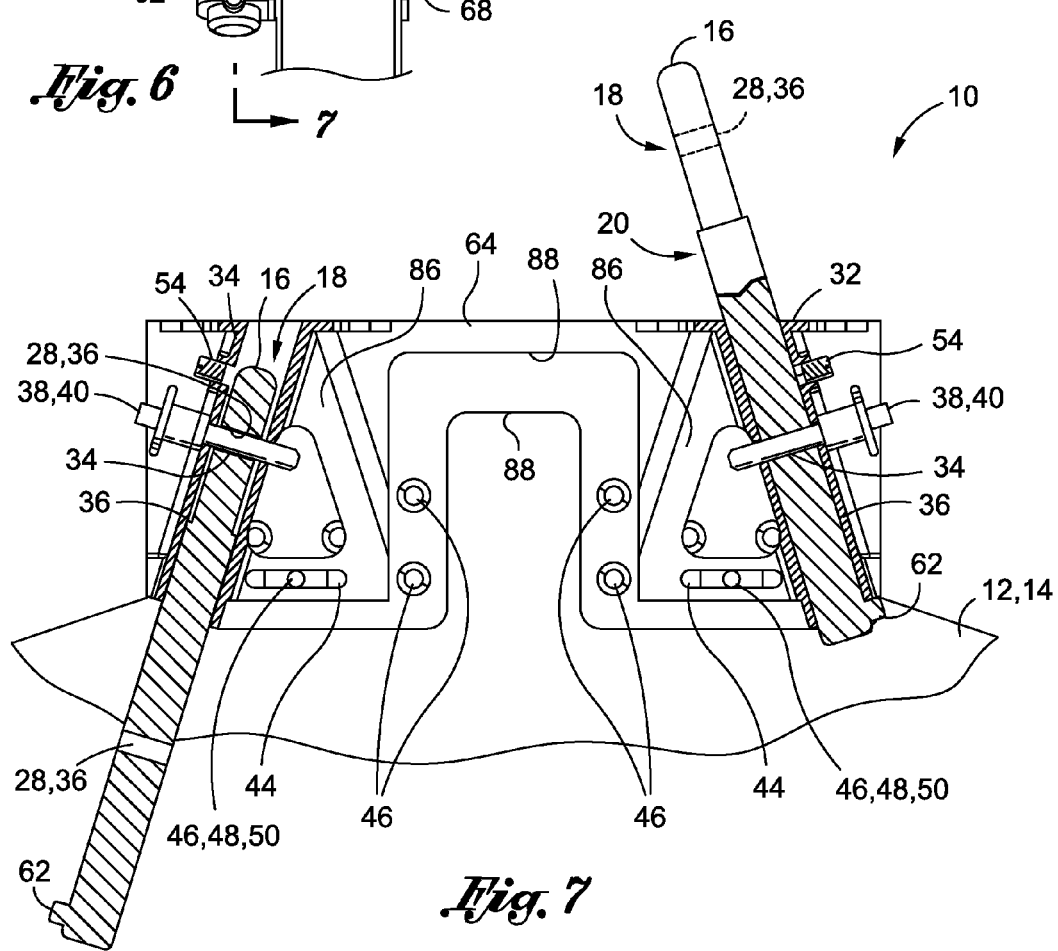
FIG. 7 is a sectional illustration of the attachment assembly taken along lines 7-7 of FIG. 6 and illustrating a pair of quick release pins for insertion into the sleeves and structural pins for securing the structural pins in the retracted position and in the deployed position.

As best seen in FIG. 7, the primary support 32 may incorporate structural reinforcements such as the triangularly shaped web 86 to which the sleeves 34 may be interconnected. The web 86 may facilitate transfer of loads from the panel member 12 into the sleeve 34 and, ultimately, into the mating structure such as the aircraft ceiling structure 108 illustrated in FIG. 3. It should be noted that the triangularly shaped web 86 disposed in mirror image on opposing ends of the primary support 32 is exemplary only and should not be construed as limiting the web geometry.

Referring to FIGS. 5-8, it can be seen that each of the structural pins 16 may include a transversely oriented stop 62 extending outwardly from the lower portion 20 of the structural pin 16. The stop 62 is preferably configured to limit upward movement of the structural pin 16 within the sleeve 34 and is further preferably configured to engage a recess formed in a lower end of the sleeve 34 in order to clock or angularly orient the structural pin 16 relative to the sleeve. In this regard, upon engagement of the stop 62 within the recess, the flats 26 formed on the upper portion 18 of the structural pin 16 are preferably aligned with the mating aircraft ceiling structure 108 in the forward-aft direction.

In addition, apertures 28 or bores 36 formed in the sleeves 34 and in the structural pins 16 are also preferably aligned to allow for insertion of a locking mechanism 38 such as a quick release pin 40. The quick release pin 40 locks the structural pin 16 into the retracted position 22 shown in FIG. 7 on the left-hand side of the attachment assembly 10 or the deployed position 24 shown on the right-hand side of the attachment assembly 10 in FIG. 7. The spaced pair of apertures 28 or bores 36 shown in FIG. 7 correspond to the retracted and deployed positions 22, 24 of the structural pins 16.

Referring to FIG. 7, the structural pins 16 are preferably configured such that in the retracted position 22, a tip of the structural pin 16 preferably resides below the horizontal leg 90 of the base support 30 and the primary support 32. In this manner, snagging or catching of the structural pins 16 on adjacent hardware or on the aircraft interior is prevented. Likewise, by storing the structural pins 16 in the retracted position 22 with the tips hidden inside the sleeves 34, damage to the structural pins 16 is prevented. Furthermore, the panel member 12 may be freely maneuvered within the tight confines of the aircraft cabin 102.

Although the stops 62 are shown as being protrusion extending outwardly from a side of the lower portion 20, alternative configurations for the stop 62 are contemplated such as an annular collar configuration disposed on an end of the structural pin 16. Regardless of their specific configuration, the stops 62 are preferably configured to facilitate alignment of the apertures 28 or bores 36 formed in the structural pins 16 and sleeves 34 so that the locking mechanism 38 (e.g., quick release pin) may maintain the structural pin 16 in the retracted or deployed positions 22, 24.

Figure 4:
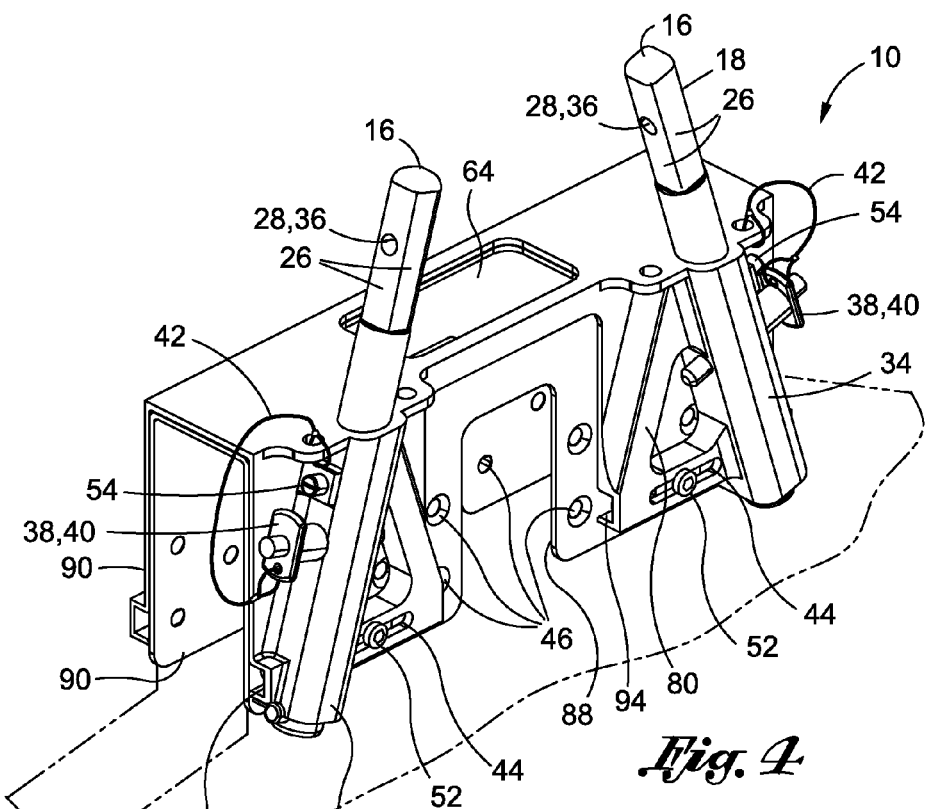
FIG. 4 is a perspective illustration of the attachment assembly in one embodiment and illustrating a pair of structural pins extended from a pair of sleeves of the attachment assembly wherein the structural pins are shown in a deployed position.
Figure 5:
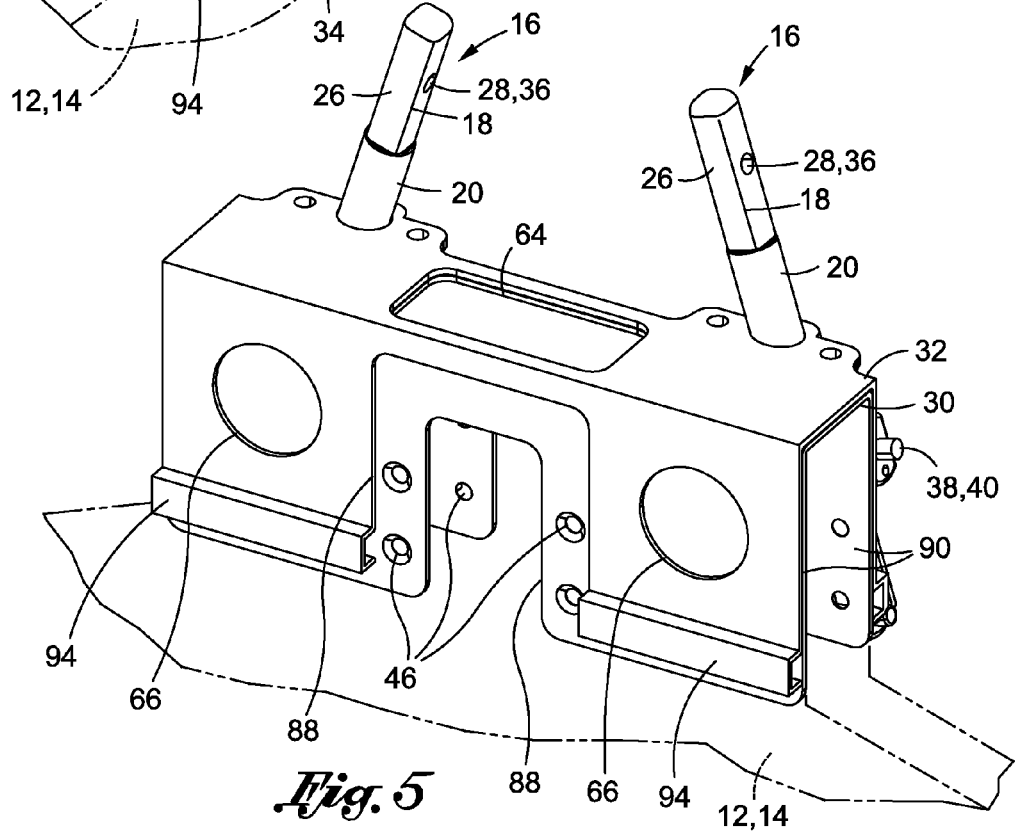
FIG. 5 is a perspective illustration of the attachment assembly of FIG. 4 taken along a back side thereof and illustrating fastener holes optionally included for connecting the attachment assembly to a divider panel.
Figure 6:
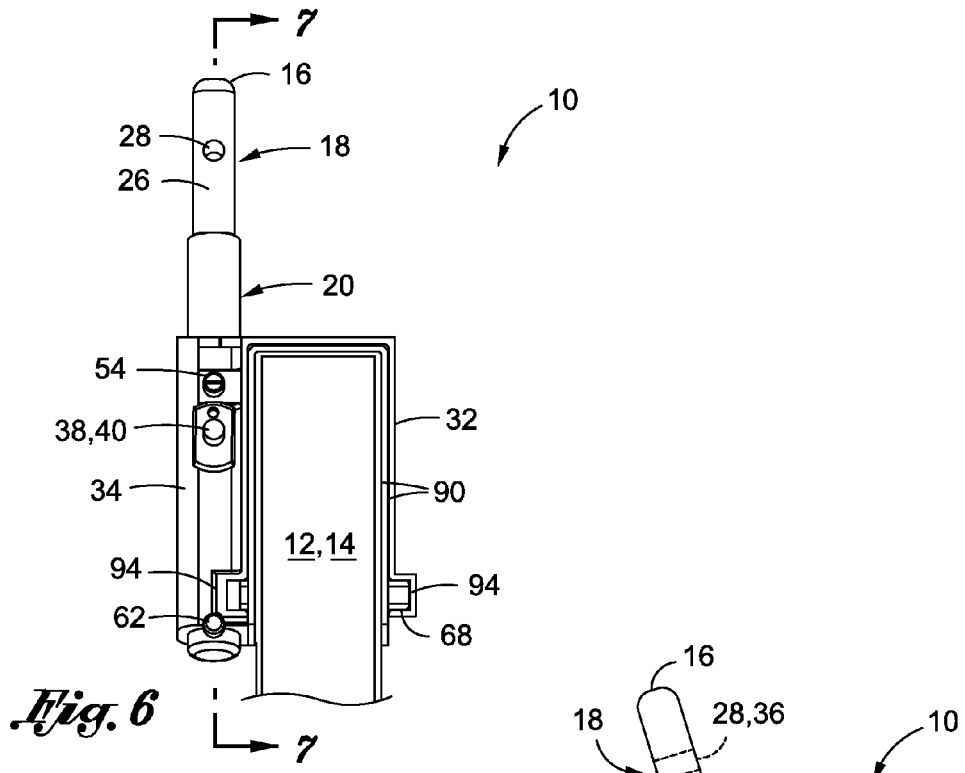
FIG. 6 is a sectional illustration of the attachment assembly in one embodiment and illustrating a base support disposed in overlapping contact with the class divider and further illustrating a primary support disposed in overlapping contact with the base support.

Referring briefly to FIG. 4, shown is the attachment assembly 10 which may comprise a lanyard 42 tethering the quick release pin 40 of each of the sleeves 34 to the primary support 32 to prevent loss of the quick release pin 40. In this regard, the lanyard 42 minimizes or eliminates loose hardware. Each one of the sleeves 34 may optionally include at least one anti-rattle pin 54 or other suitable mechanism to prevent lateral movement of the structural pin 16 relative to the sleeve 34. The anti-rattle pin 54 is preferably configured to prevent the generation of vibrational noise produced by the structural pin 16 rattling or vibrating within the sleeve 34. The anti-rattle pin 54 may be configured as a set screw adapted to engage a threaded bore 36 formed in the sleeve 34.

As best seen in FIG. 4, the anti-rattle pin 54 may be tightened such that the structural pin 16 is forced against the inside surface of the sleeve 34 following positioning of the structural pin 16 in the deployed position 24. The anti-rattle pin 54 may also be tightened with the structural pin 16 in the retracted position 22 as best seen in FIG. 4 to prevent loss of the set screw during storage, transportation and installation of the attachment assembly 10. Alternative hardware may be provided to prevent rattling noises. In this regard, bumpers (not shown) may be disposed between the sleeve 34 and structural pins 16 to prevent direct contact therebetween.

Referring to FIGS. 4-8, the structural pins 16 may each include at least one flat 26 formed on an upper portion 18 of the structural pin 16. More preferably, four orthogonally arranged flats 26 are provided on the upper portion 18 of the structural pin 16 to improve the load distribution between the structural pin 16 and the aircraft ceiling structure 108. The flats 26 are preferably oriented in general alignment with the forward and aft directions of the aircraft 100 to better distribute loads to the housing supports 58.

As was earlier mentioned, class dividers 14 are typically required to withstand loads that are oriented primarily in the forward and aft directions. Toward this end, the orthogonal arrangement and orientation of the flats 26 as shown facilitates forward-aft load transfer while also facilitating load transfer in the lateral or sideways direction. As was earlier noted, such lateral loads may be applied by passengers leaning against the class divider 14 or grasping the class divider 14 for balance while moving about the aircraft cabin 102. In this regard, the flats 26 prevent concentrated point loads that may otherwise occur with a cylindrically shaped upper portion 18.

The housing support 58 into which the structural pin 16 is inserted is preferably sized and configured complementary to the flats 26 formed on the structural pin 16. Bushings 60 may be provided in the housing supports 58 to improve load transfer and to facilitate sliding engagement of the structural pins 16. The bushings 60 are preferably fabricated of a low-friction material such as Teflon or nylon. However, any suitable material such as a suitable polymeric material may be used although metallic or ceramic material may also be used. Likewise, the structural pins 16 preferably have a low-friction coating comprising any variety of coating compositions including, but not limited to, Teflon coating or an anodize coating.

In a further embodiment, the attachment assembly 10 may comprise a biasing mechanism 82 such as a compression spring 84 to bias the structural pin 16 toward the deployed position 24. The biasing mechanism 82 may be disposed between the structural pin 16 and the sleeve 34 and may be configured as a compression spring 84 captured between the sleeve 34 and the structural pin 16. Although not shown in the embodiments illustrated in the figures, the biasing mechanism 82 may be included in attachment assemblies 10 where access is limited in the interface between the structural pin 16 and the housing supports 58 or other mating structure.

Referring to FIGS. 1-8, the manner of operation or use of the attachment assembly 10 will now be described. During the final assembly of an aircraft 100 wherein the class dividers 14 are installed, the structural pins 16 are preferably moved to the retracted position 22 as shown in FIG. 4 on the left-hand side of the attachment assembly 10. The base support 30 of the attachment assembly 10 is preferably pre-mated or joined to the class divider 14 such as by using mechanical fasteners 52 or bonding or by combination thereof. The primary support 32 is preferably disposed in overlapping relation to the base support 30 such that the channel sections 92 of the primary support 32 are nested with the bosses 68 of the base support 30. Fasteners 52 may be inserted loosely in the slots 44 and threadably engaging the threaded members 48 (e.g., helicoils 50) provided in the bosses 68.

With the class divider 14 (i.e., panel member 12) being positioned in the desired location in the aircraft cabin 102, the lower end of the class divider 14 is secured such as by mounting the engagement mechanisms 114 to the mating features formed in the seat track 106. The quick release pins 40 are removed from the bores 36 such that the structural pins 16 may be slid upwardly from the retracted position 22 to the deployed position 24 so that the upper portions 18 of the structural pins 16 engage the mating structure (e.g., housing supports 58 in the aircraft ceiling structure 108) until the stops 62 engage the recesses formed in the sleeves 34.

Misalignment between the structural pins 16 and the housing supports 58 may be compensated for by laterally sliding the primary support 32 relative to the base support 30. Following adjustment, the fasteners 52 extending through the slots 44 and into the threaded members 48 are tightened to lock the primary support 32 to the base support 30. Once moved to the deployed position 24, the quick release pins 40 are inserted into the aligned bores 36 of the sleeves 34 and structural pins 16 to lock the structural pin 16 into position.

The anti-rattle pins 54 (i.e., set screws) may then be tightened to force the structural pin 16 against the inner side wall of the sleeve 34 in order to prevent vibrational noise.

Referring now to FIGS. 9-15, shown is a further implementation of the attachment assembly 10 in a secondary door 70. The secondary door 70 may include a door frame 72 which may have a pair of attachment assemblies 10 disposed in opposing sides of the door frame 72. More specifically, the door frame 72 may include a pair of telescoping structural pins 16 with each one of the structural pins 16 being moveable between the retracted and deployed positions 22, 24 such that the door frame 72 may be secured to the aircraft cabin 102.

Figure 9:
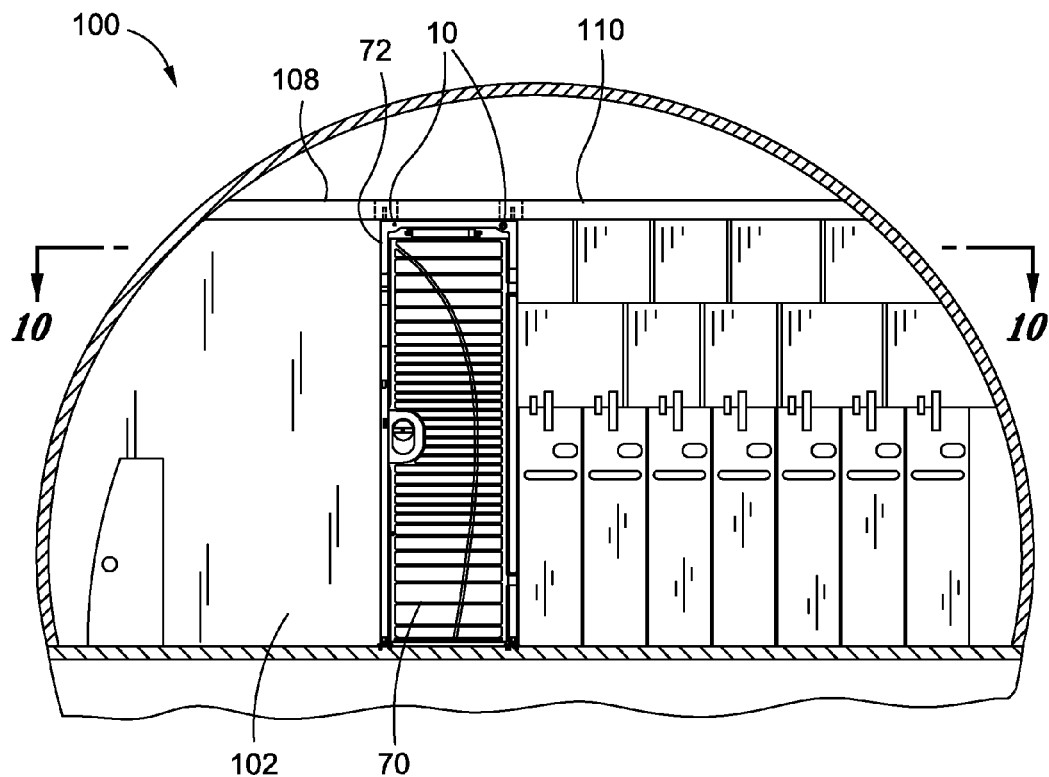
FIG. 9 is a sectional illustration of the aircraft cabin taken along lines 9-9 of FIG. 1 and illustrating a secondary door as may be installed adjacent a cross-aisle area opposite the flight deck of an aircraft.
Figure 10:
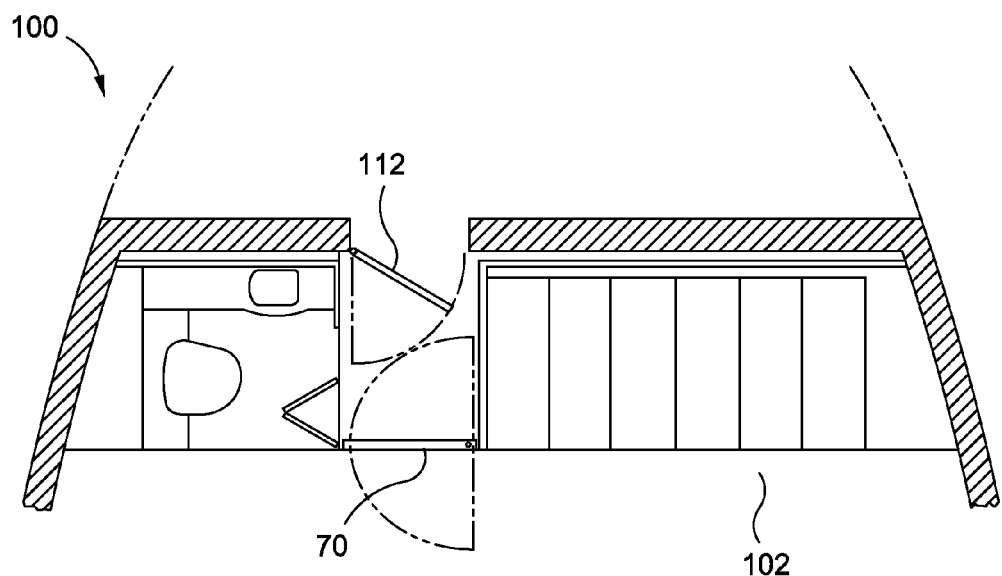
FIG. 10 is a top illustration of the secondary door taken along lines 10-10 of FIG. 9 and illustrating the relative positioning of the secondary door and the flight deck door.
Figure 11:
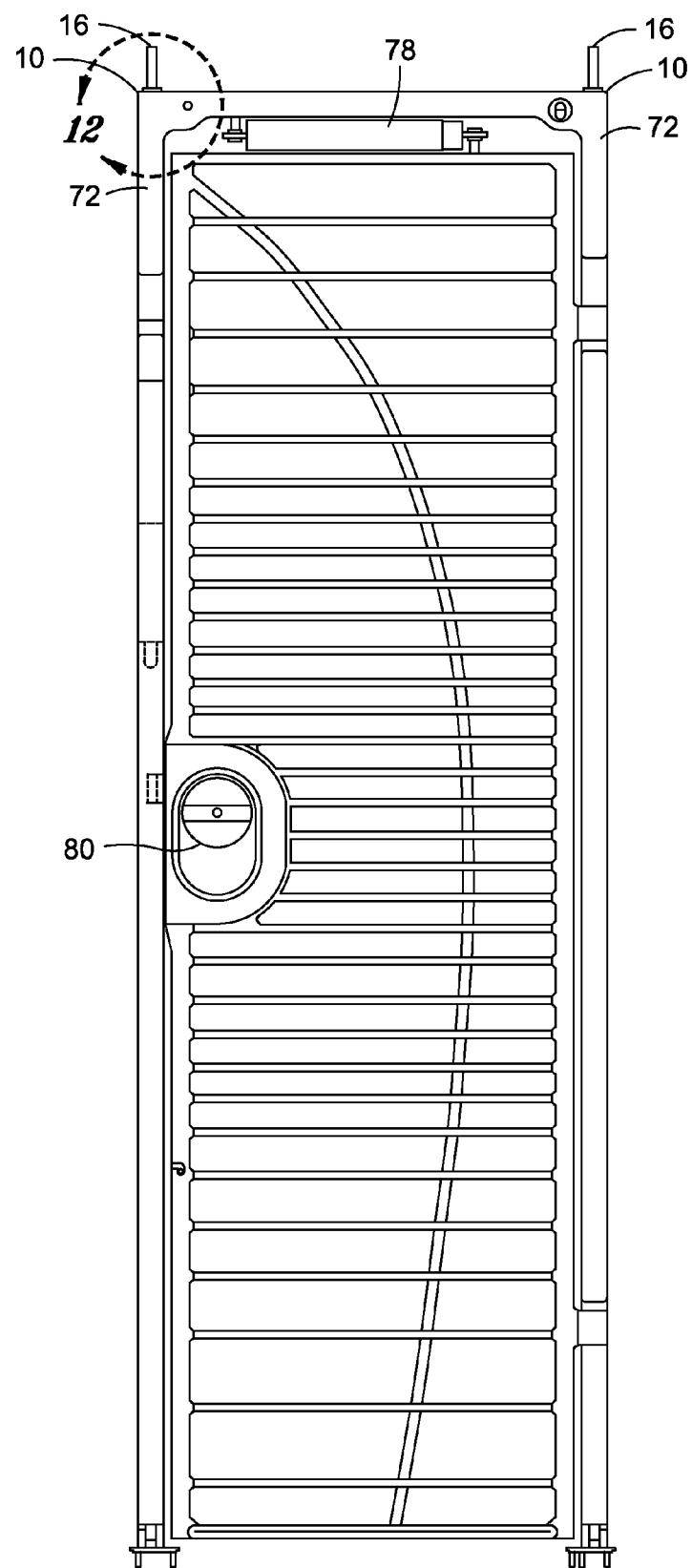
FIG. 11 is an enlarged illustration of the secondary door having a pair of the attachment assemblies integrally disposed within a door frame.

As best seen in FIGS. 9-10, the aircraft 100 may include a flight deck having a conventional flight deck door 112. The secondary door 70 may be configured to be installed between the flight deck door 112 and the aircraft cabin 102 in order to secure the flight deck by creating a neutral space between the flight deck door 112 and the secondary door 70 in the vestibule located outside the flight deck. In this regard, a crew member exiting the flight deck first opens and passes through the flight deck door 112. With the secondary door 70 in the closed position as shown in FIGS. 9-10, the crew member closes and secures the flight deck door 112 prior to opening the door latch assembly 80 and passing through the secondary door 70 with the assistance of damper 78. The secondary door 70 is then locked such that at no time is the flight deck accessible except during landing and takeoff.

The attachment assembly 10 as implemented in the secondary door 70 may comprise structural pins 16 disposed on opposing sides of the door frame 72 as best seen in FIGS. 11-15. The structural pins 16 are configured to be extended upwardly from upper portions 18 of the door frame 72 through an optional ceiling panel 110 to engage appropriate structure in the aircraft 100 such as the housing support 58 which may be similar to those described above with regard to the class divider 14. As was mentioned above, the housing supports 58 may be included with the aircraft ceiling structure 108 and may include bushings 60 sized and configured to receive the structural pins 16. The lower portion 20 of the door frame 72 may be configured to engage appropriate hardware mounted on the floor of the aircraft cabin 102.

Figure 12:
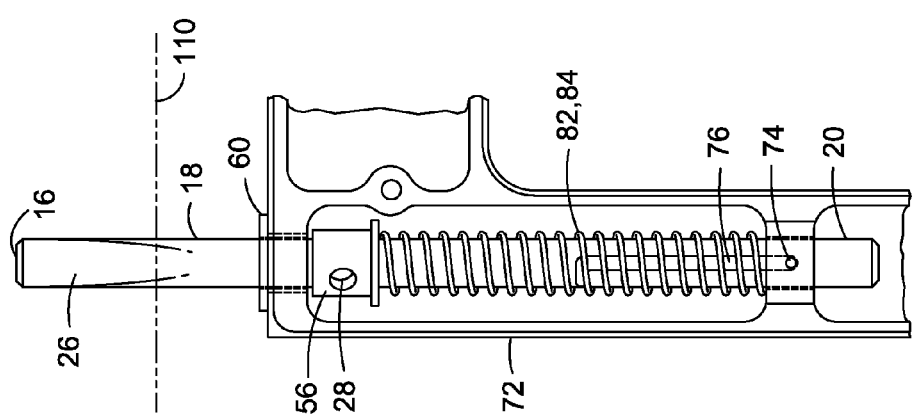
FIG. 12 is a view of the attachment assembly installed within one side of the door frame and illustrating a biasing member (e.g., a compression spring) biasing the structural pin into the deployed position.
Figure 13:
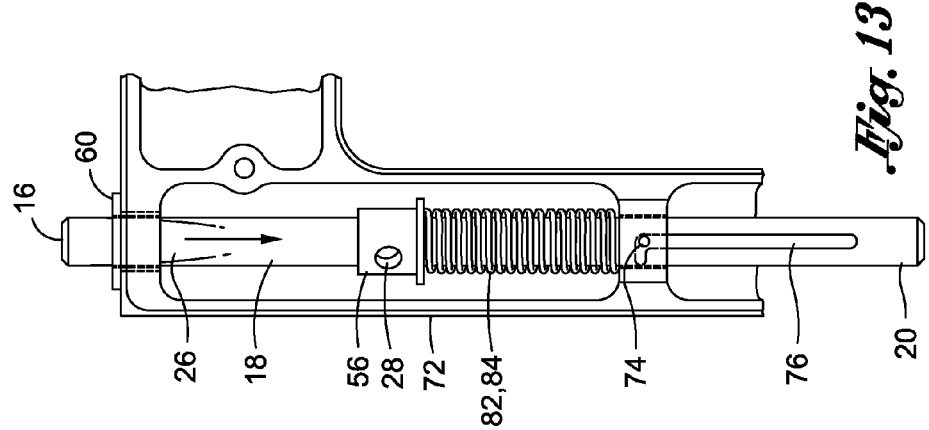
FIG. 13 is a view of the structural pin having been axially translated downwardly and further illustrating an anti-rotation pin cooperatively engaged to a groove formed in the structural pin.
Figure 14:
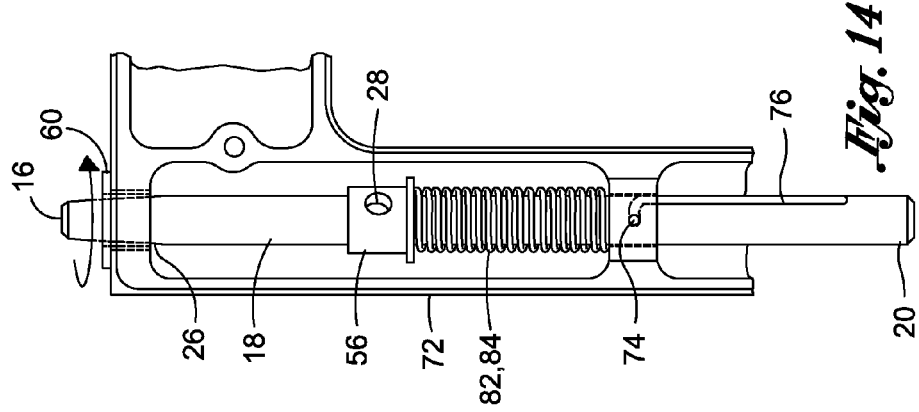
FIG. 14 is a view of the structural pin rotated into the retracted position wherein the anti-rotation pin is engaged to a horizontal portion of the groove.
Figure 15:
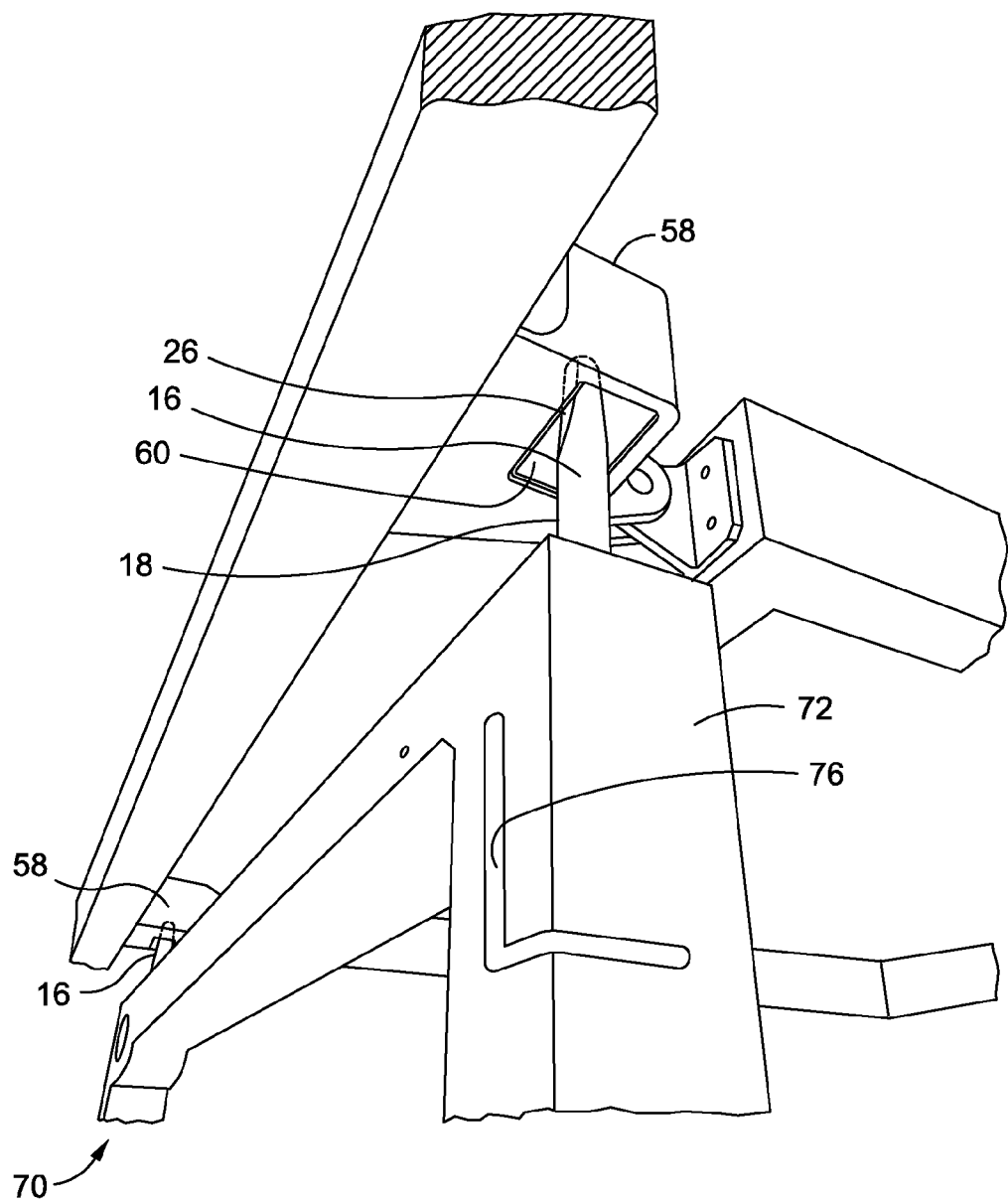
FIG. 15 is an enlarged perspective view of the engagement of the structural pins to a corresponding pair of housing supports.

Referring to FIGS. 12-14, the sequence for retracting the structural pins 16 of the secondary door 70 is illustrated wherein the structural pin 16 is shown in FIG. 12 in the deployed position 24. Each one of the structural pins 16 may include a set of apertures 28 or bores 36 similar to that which was described above with reference to the structural pins 16 of the class divider 14. However, in the embodiment illustrated in FIGS. 12-14, a single aperture 28 or bore 36 may be formed in a collar 56 disposed annularly about the structural pin 16 for receiving a tool such as a Phillips head screwdriver to facilitate rotation of the structural pin 16. The tool may be inserted through a groove 76 formed vertically and horizontally in the door frame 72 as best seen in FIG. 15. The tool may be inserted in the aperture 28 or bore 36 formed in the collar 56 of the structural pin 16.

Using the tool, the structural pin 16 may be pulled downwardly against the biasing force of the biasing mechanism 82 into the retracted position 22 as best seen in FIG. 13. An anti-rotation pin 74 may be disposed on an interior portion of the door frame 72 and may be engaged to a groove 76 formed primarily axially along a length of the structural pin 16. The anti-rotation pin 74 and groove 76 cooperate to prevent rotation of the structural pin 16 in the deployed position 24 and thereby maintain the orientation of the flats 26 which may be optionally included on the upper portion 18 of the structural pins 16. As was earlier mentioned, the flats 26 are preferably oriented in alignment with the forward and aft directions of the aircraft 100 and are configured to distribute loads into the housing supports 58 or other structure to which the structural pins 16 may engage.

Deployment of the structural pin 16 is essentially the reverse of the above description and is assisted by the biasing mechanism 82 which is shown in the figures as a compression spring 84 to bias the structural pin 16 toward the deployed position 24. In this regard, following rotation of the structural pin 16 out of the horizontal portion of the groove 76 and into the axial portion, the compression spring 84 forces the structural pin 16 upwardly into the housing supports 58.

Preferably, each of the housing supports 58 includes a bushing 60 which is sized and configured to mate with the upper portion 18 of the structural pin 16. The bushing 60 is preferably fabricated of polymeric material such as Teflon or nylon to allow a close tolerance fit with the structural pin 16 and to facilitate uniform load distribution. In this regard, the structural pin 16 is preferably provided with a low-friction coating such as a Teflon coating or an anodized coating to facilitate sliding engagement with the bushing 60 and to prevent direct metal-to-metal contact.

The attachment assembly 10 as implemented in the panel member 12 (i.e., class divider 14) of FIGS. 1-8 and the secondary door 70 illustrated in FIGS. 9-15 facilitates installation thereof without the use of special tools or loose fasteners. In this regard, the attachment assembly 10 provides a self-contained attachment mechanism requiring minimal hardware with reduced assembly and installation time. The attachment assembly 10 also minimizes the use of torque wrenches and time-consuming inspection and/or verification procedures.

The above description is given by way of example and not limitation. Given the above disclosure, one skilled in the art could devise variations that are within the spirit and scope of the disclosure provided herein. Furthermore, the various features of the embodiments disclosed can be used alone or in varying combinations with each other and are not intended to be limited to the specific combinations provided herein. Thus, the scope of the claims is not to be limited by the illustrated embodiments.

What is claimed is:

1. An attachment assembly for securing a panel member, comprising:
   a pair of structural pins extendable in angled relation toward one another from a retracted position to a deployed position into a corresponding pair of apertures formed in a structure;
   a U-shaped base support configured to be mounted in overlapping, nesting contact with the panel member; and
   a U-shaped primary support mounted in overlapping, nesting contact with an exterior of the U-shaped base support and having a pair of sleeves sized and configured to receive the structural pins;
   each one of the sleeves having a locking mechanism insertable through bores extending transversely through the sleeve and the structural pin upon alignment of the bores, the locking mechanism preventing axial movement of the structural pin relative to the sleeve.

2. The attachment assembly of claim 1 wherein:
   each one of the sleeves and the structural pins including a set of the bores disposed in axially spaced relation along respective lengths thereof such that each one of the locking mechanisms maintains the axial position of the structural pin in one of the retracted and deployed positions.

3. The attachment assembly of claim 1, wherein each one of the locking mechanisms is configured as a quick release pin.

4. The attachment assembly of claim 1 wherein the base support and primary support include an adjustment mechanism for adjusting the lateral position of the primary support relative to the panel member.

5. The attachment assembly of claim 4 wherein:
the adjustment mechanism comprises at least one laterally-oriented slot formed in the primary support and at least one fastener hole formed in the base support;
the slot and fastener hole being sized and configured to receive a fastener to facilitate frictional engagement of the primary support to the base support.

6. The attachment assembly of claim 1 further comprising:
interlocking channels for adjusting a lateral position of the primary support relative to the panel member.

7. The attachment assembly of claim 1 wherein the structural pins are sized and configured to extend into an aircraft ceiling structure.

8. The attachment assembly of claim 1 wherein the panel member is configured as a divider panel for an aircraft cabin.

9. The attachment assembly of claim 1 wherein each one of each sleeve includes at least one anti-rattle pin configured to prevent lateral movement of the structural pin relative to each sleeve.

10. An aircraft, comprising:
an attachment assembly including;
a pair of structural pins extendable in angled relation toward one another from a retracted position to a deployed position into a corresponding pair of apertures formed in an aircraft ceiling structure;
a U-shaped base support configured to be mounted in overlapping, nesting contact with the panel member; and
a U-shaped primary support mounted in overlapping, nesting contact with an exterior of the U-shaped base support and having a pair of sleeves sized and configured to receive the structural pins;
each one of the sleeves having a locking mechanism insertable through bores extending transversely through the sleeve and the structural pin upon alignment of the bores and preventing axial movement of the structural pin relative to the sleeve.

\* \* \* \* \*